United States Patent

[11] 3,588,166

| [72] | Inventor | Donald F. Day |
| | | 9213 Tamarind St., Fontana, Calif. 92335 |
| [21] | Appl. No. | 826,586 |
| [22] | Filed | May 21, 1969 |
| [45] | Patented | June 28, 1971 |

[54] MULTIPLE COMPARTMENT STRUCTURE FOR TRUCKS
13 Claims, 7 Drawing Figs.

[52] U.S. Cl. ................................................... 296/24,
119/12, 211/177
[51] Int. Cl. ...................................................... B60p 3/04,
B62d 33/04
[50] Field of Search .......................................... 296/3, 10,
12, 24, 24 (3); 119/11, 12, 15, 15.7, 17, 21;
211/148, 177; 312/265

[56] References Cited
UNITED STATES PATENTS
| 810,544 | 1/1906 | Krag | 312/265X |
| 1,694,732 | 12/1928 | Cohen | 119/12 |
| 2,096,356 | 10/1937 | Fox | 119/17X |
| 2,099,774 | 11/1937 | Spencer | 119/12 |
| 2,186,009 | 1/1940 | Clark et al. | 119/17 |
| 2,529,649 | 11/1950 | Coplen | 211/148X |
| 2,720,414 | 10/1955 | Hart | 296/12 |
| 3,476,084 | 11/1969 | Nater et al. | 119/12 |

FOREIGN PATENTS
| 1,094,961 | 12/1960 | Germany | 312/265 |

Primary Examiner—Kenneth H. Betts
Assistant Examiner—Leslie J. Paperner
Attorney—Jess M. Roberts ABSTRACT: A structure that forms layers of compartments on a truck bed for transporting fowls comprises a plurality of upright rods, side and back compartment wall panels that telescopically engage the rods and vertically spaced floor panels that also telescopically engage the rods.

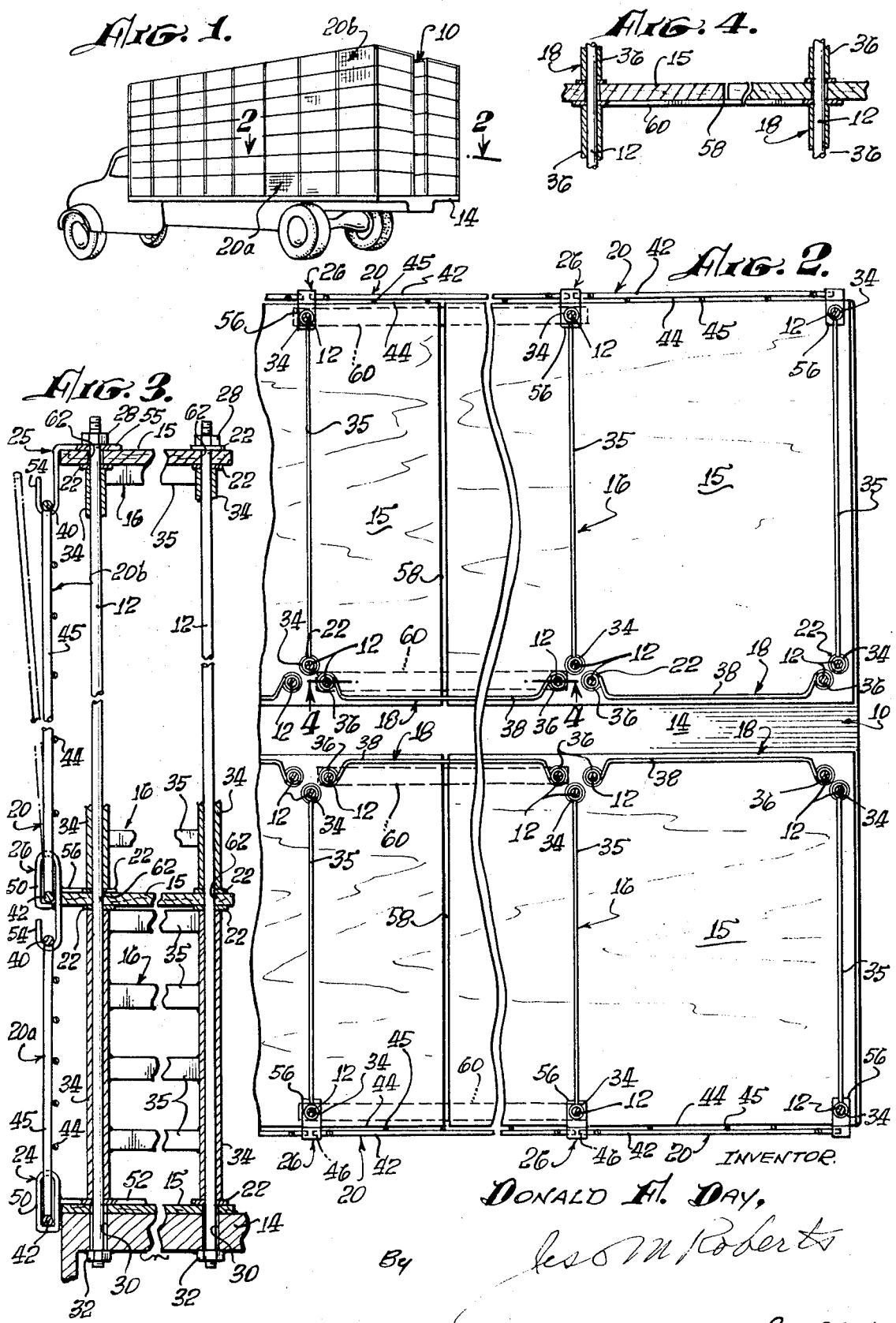

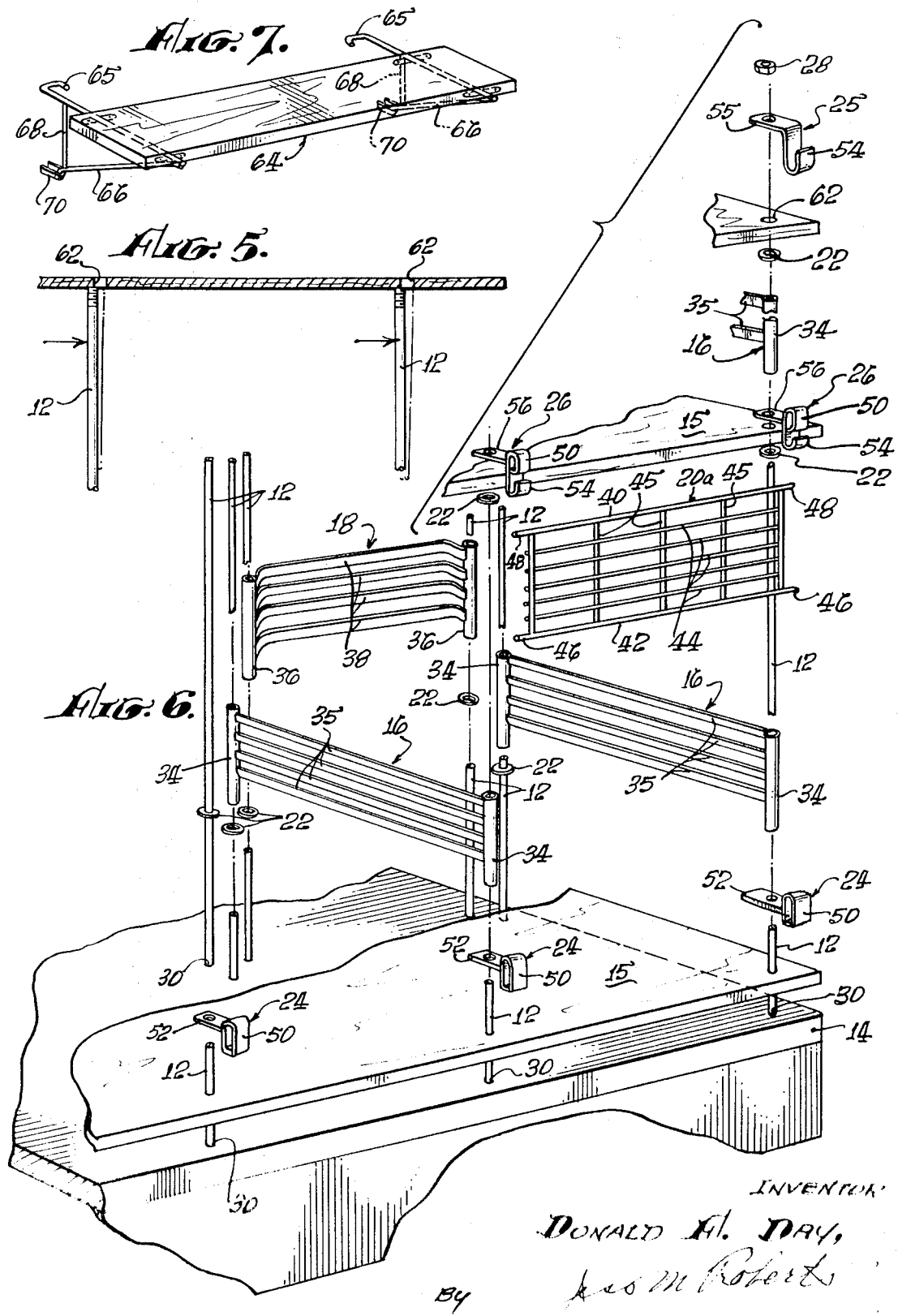

MULTIPLE COMPARTMENT STRUCTURE FOR TRUCKS

BACKGROUND OF THE INVENTION the transportation of chickens, turkeys and the like is necessary on a large scale for the national food supply and for this purpose tiers of compartments or coops are commonly built on truck beds. Typically, there are two longitudinal rows of compartments in each layer with the compartments provided with doors that open onto the opposite sides of the truck. For example, there may be seven or eight layers of compartments with two rows of 8 to 10 compartments in each layer for a total of 112 to 160 compartments on a truck bed.

Conventional compartmental structures of this character are expensive because each compartment is fabricated by a skilled laborer and a complete structure represents an inordinately large number of man hours. Another disadvantage is that such a multiple compartment structure is too bulky to ship and therefore a truck that is to be equipped with a structure must usually travel to the manufacturer even if the distance is many hundred miles.

A further disadvantage is that the multiple compartment structure is permanently mounted on the truck and the truck may stand idle during the whole off season for the simple reason that it would cost too much to dismantle the structure at the end of the season and then to rebuild it at the beginning of the next season.

A still further disadvantage is that a conventional compartmental structure of this character is not sufficiently rugged for continuous service without lost time for repairs. What is needed is a structure that can withstand severe impacts and strains over a long service life.

The object of the present invention is to provide such a compartmental structure for trucks that is economical to construct, that may be shipped inexpensively in compact knockdown state, that may be assembled to a truck bed in a short time wholly by unskilled help and that may be economically dismantled to permit profitable use of the truck during the off season.

SUMMARY OF THE INVENTION

The multiple compartment shipping structure taught by the present invention is of a modular construction with the modules anchored by multiple upright rods that are releasably screw threadedly anchored to the truck bed.

Two types of modules are provided that directly engage the upright rods to provide the sidewalls and backwalls of the compartments and a third type of module forms the doors on the outer sides of the compartments, the doors being mounted on brackets that engage the upright rods. A fourth type of module forms the floors of the compartments as well as the roof of the completed structure and may be in the form of sheets of heavy plywood with holes to receive the upright rods.

A module that functions as a sidewall of a compartment is in the form of a panel with tubular portions at its opposite ends dimensioned to telescope over the upright rods. The modules that serve as the backwalls of the compartments are of the same character.

In the preferred practice of the invention each panel for a sidewall of a compartment as well as each panel for a backwall of a compartment is fabricated by cutting two metal tubes to length and interconnecting the two tubes by welding thereto the opposite ends of spaced parallel metal bars. Such panels may be factory produced economically with the use of suitable jigs and, if desired, may be coated with a suitable plastic to protect the metal against corrosion and to make the structure more sanitary.

The modules to serve as doors may be grills of welded construction fabricated from metal rod stock in the same economical manner. The brackets for mounting the doors may be made of heavy sheet metal that is suitably formed and punched.

In the assembly of such a structure to a truck bed, suitable nuts are welded to the truck bed for screw-threaded engagement with the upright rods and then the upright rods are screwed into the nuts. The next step is to rest a floor panel on the upper ends of the upright rods with the rods slightly out of complete register with the bores in the panel. When the upright rods are flexed slightly into register with the corresponding bores in the panel, the panel simply gravitates to the truck bed to a position to serve as the floor for the first layer of compartments. A single floor panel may be used for the full length of the truck or several shorter floor panels may be used with the confronting ends of the panels held in alignment by metal straps that are punched to telescope over the rods.

The next step is to telescope suitable flat washers over the respective upright rods to gravitate to positions on the floor panel to serve as spacers between the floor panels and the tubular ends of wall panels. The next step is to telescope over the upright rods the tubular ends of the sidewall panels and the backwall panels and the door brackets for the first layer of compartments of the structure. The tubular end portions of each wall panel are slipped over the upper ends of the corresponding rods and then the panel is simply lowered to rest on the corresponding flat washers on the floor of the first layer of compartments.

Each succeeding layer of compartments is assembled in this manner and finally a floor panel to serve as a roof is mounted on the top of the structure and then nuts are screwed onto the upper ends of the upright rods to tighten the whole structure against the truck bed. The completed structure may then be reinforced if desired by suitable diagonal cables or guy wires.

It will be readily appreciated that such a modular construction may be quickly and efficiently assembled by unskilled help. It is also apparent that the structure may be repeatedly dismantled and reassembled at reasonable cost. It is especially advantageous that the modules may be compactly arranged for shipment to truck owners.

The preferred embodiment of the invention further includes platforms that may be removably mounted on the opposite sides of the completed multiple compartment structure to facilitate the loading of fowls into the compartments. Each of the platforms has hooks at its opposite ends to engage tubular portions of the compartment wall panels and each of the opposite ends is further provided with a downwardly extending diagonal brace to removably straddle a tubular portion of a compartment panel.

The features and advantages of the invention may be understood from the following detailed description and the accompanying drawings.

BRIEF DESCRIPTION OF THE DRAWINGS

In the drawings, which are to be regarded as merely illustrative:

FIG. 1 is a perspective view of a truck equipped with the preferred embodiment of the multiple compartment structure;

FIG. 2 is a fragmentary horizontal section taken as indicated by the line 2-2 of FIG. 1;

FIG. 3 is a fragmentary vertical section on a larger scale;

FIG. 4 is a fragmentary vertical section taken as indicated by the line 4-4 of FIG. 2;

FIG. 5 is a fragmentary view partly in section and partly in side elevation showing how a floor panel may be placed on top of the upright rods with bores of the panel out of register with the rods so that the upper ends of the rods may be subsequently flexed into register with the bores of the floor panel to permit the floor panel to gravitate downward to its assembled position;

FIG. 6 is an exploded perspective view of a portion of the multiple compartment structure; and FIG. 7 is a perspective of a loading platform that may be removably mounted on the side of the structure.

DESCRIPTION OF THE PREFERRED EMBODIMENT

FIG. 1 is a perspective view of the completed structure on a base which in this instance is a truck bed, the structure providing compartments arranged in longitudinal rows and vertical tiers. In this embodiment there are seven layers of compartments arranged in two longitudinal rows and the longitudinal rows are spaced apart to provide a longitudinal ventilation space 10. All of the compartments open onto the sides of the truck, each compartment being provided with a suitable door as will be described.

As best shown in FIG. 6 the components that are employed to assemble the structure include the following: a plurality of rods 12 extending upright from the truck bed 14; a plurality of floor panels 15 which may be made of plywood, each floor panel being approximately as wide as a longitudinal rows of the compartments; a plurality of sidewall panels 16 having tubular ends to telescope over corresponding rods 12; a plurality of rear or back wall panels 18 having tubular ends to telescope over corresponding rods 12; a plurality of door panels 20; a plurality of flat washers 22; a plurality of bottom door brackets 24 for use at the bottom of the lowermost layer of compartments; a plurality of top door brackets 25 to be mounted topside the uppermost layer of compartments; a plurality of intermediate door brackets 26 to be mounted at the intermediate floors of the structure; and a plurality of nuts 28 to be screwed onto the upper ends of the various rods 12 to tighten the structure against the truck bed 14. FIG. 3 shows how each of the upright rods 12 may extend through a corresponding bore 30 in the truck bed 14 into screw-threaded engagement with a nut 32 that is welded to the underside of the truck bed.

Referring again to FIG. 6 each sidewall panel 16 may comprise a pair of metal tubes 34 interconnected by a plurality of spaced metal bars 35 that are welded thereto. In like manner, each of the rear wall panels 18 may comprise a pair of metal tubes 36 interconnected by a plurality of spaced transverse bars 38, the metal bars being preferably offset or slightly bowed rearwardly as shown.

Each of the doors 20 is in the form of a grill of welded construction made of metal rod stock. Each door has a top horizontal rod 40, a bottom horizontal rod 42 and a plurality of intermediate lighter horizontal rods 44 all of which are interconnected by spaced vertical rods 45. The opposite ends of the bottom rod 42 are extended to form pivots 46 for pivotal engagement with door brackets and the opposite ends of the top rod are extended to form what may be called latch pins 48 for releasable engagement with door brackets.

Each of the bottom door brackets 24 has a metal loop 50 and a rearwardly extending tongue 52 that is apertures to telescope over an upright rod 12. Each of the top door brackets 25 is formed to provide a hook 54 and a rearwardly extending tongue 55 that is apertured to telescope over an upright rod 12. Each of the intermediate door brackets 26 has both a metal loop 50 and a hook 54 as well as a rearwardly extending tongue 56 that is apertured to telescope over an upright rod 12.

The two opposite pivots 46 of a door 20 are loosely captivated by loops 50 of the door brackets and the two opposite latch pins 48 of the door releasably engage corresponding hooks 54 of the door brackets. Thus as shown in FIG. 3, the pivots 46 of a lowermost door panel 20a are captivated by corresponding loops 50 of bottom door brackets 24 and the two latch pins 48 cooperate with corresponding hooks 54 of intermediate door brackets 26. In like manner, the pivots 46 of the uppermost door panel 20b in FIG. 3 engage corresponding loops 50 of intermediate door brackets and the latch pins 48 of the door panel cooperate with corresponding hooks 54 of top door brackets 25. It is apparent that the uppermost door panel 20b, for example, may be opened by first lifting the door panel to lift the latch pins 48 of the door panel clear from the corresponding hooks 54 thereby to permit the door panel to be swung outwardly towards open position with the door pivoting about the two loops 50 of the intermediate door brackets 26.

FIG. 2, which is a fragmentary plan view of the second floor of the structure, shows how the sidewall panels 16 and the rear wall panels 18 are anchored by corresponding vertical rods 12 to form the two horizontal rows of compartments with the two rows separated by the longitudinal ventilation space 10. FIG. 2 also shows how two floor panels 15 meet end to end to form a juncture 58 and shows how the juncture may be reinforced from below by a pair of flat rigid bridging bars 60 that bridge the juncture. As shown in FIG. 4 each of the bridging bars 60 is apertured at its opposite ends to telescope over corresponding upright rods 12. If the floor panels 15 are as long as the truck bed 14, no bridging bars are necessary.

The method of assembling a multiple compartment structure to the bed of a truck may be readily understood from the foregoing description of the components. First the floor bed 14 is provided with the bores 30 to receive the lower ends of the rods 12 and then the nuts 32 are welded to the underside of the floor bed for anchorage of the lower ends of the rods. The holes in the floor bed are located in accord with the floor plan that is shown in FIG. 2. The next step is to thread the lower ends of all of the rods 12 into the nuts 32.

The next step is to install the lowermost floor panels 15 that are to lie flat against the upper surface of the truck bed 14. First each floor panel is positioned to rest on the upper ends of the corresponding rods 12 in the manner shown in FIG. 5 with the upper ends of the rods out of register with the corresponding bores 62. Then the upper ends of the various rods 12 are flexed into register with the bores 62 to permit the floor panel to gravitate to its installed position. No bridging bars 60 are required to reinforce the junctures of the bottommost floor panels 15 since the floor panels rest flat on the truck bed 14. The next step is to telescope the bottom door brackets 24 onto the outermost vertical rods 12 and to telescope flat washers 22 over the remaining rods. The various sidewall panels 16 and the various rear wall panels 18 are then telescoped onto the corresponding rods 12 and lowered to rest on the previously installed flat washers 22 and/or the tongues of the bottom door brackets 24.

In preparation for installing the floor panels 15 to form the floors of the second layer of compartments, bridging bars 60 are telescoped onto appropriate pairs of upright rods 12 to reinforce the junctures of the floor panels and flat washers 22 are telescoped over the remaining upright rods to rest on the tubular portions of the sidewall panels 16 and rear wall panels 18 of the first layer of compartments. It is to be noted that each of the bridging bars 60 replaces two of the flat washers 22.

The floor panels 15 for the floors of the second layer of compartments are then installed as heretofore described. It is to be noted that as the bottom door brackets 24 and the intermediate door brackets 26 are installed, the pivots 46 of the corresponding door panels 20 are inserted into the loops 50 of the door brackets.

After the floor panels 15 and the sidewall panels 16 together with the rear wall panels 18 of the topmost layer of compartments are installed, washers 22 are telescoped over the upright rods 12 to rest on the tubular portions of the sidewall panels and rear wall panels and then floor panels 15 are installed to serve as the roof of the structure, i.e., to form the ceiling of the uppermost layer of compartments. The top door brackets 25 are then installed on the upper ends of the outermost rods 12 and washers 22 are installed on the upper ends of the remaining upright rods. Finally the nuts 28 are threaded onto the upper ends of the rods 12 and tightened to clamp the multiple compartment structure against the truck bed 14.

The rods 12 may be regarded as being divided into a first of rods that cooperate with the sidewall panels 16 and a second plurality of rods that cooperate with the back wall panels 18. It is apparent that the sidewall panels 16 cooperate with the first plurality of upright rods to lend rigidity to the structure in vertical planes that are perpendicular to the longitudinal axis of the truck bed. It is also apparent that the backwall panels 18 cooperate with the second plurality of upright rods to lend rigidity to the structure in upright planes that extend longitudinally of the truck bed. Finally, it is apparent that the various floor panels 15 cooperate with both pluralities of upright rods to lend rigidity to the structure in horizontal planes and it is to be noted that each floor panel extends through more than one tier of the compartments to tie the tiers together.

FIG. 7 shows a loading platform 64 that may be removably mounted on a side of the multiple compartment structure to facilitate the loading of fowls into the various compartments. The loading platform has a pair of rearwardly extending hooks 65 that hook around the tubular portions 34 of the sidewall panels 16 adjacent the upper side of a floor panel 15. In addition the loading platform 64 has a pair of lower diagonal braces 66 that are connected to the hook 65 by vertical struts 68. Each of the diagonal braces 66 is provided at its outer end with a U-shaped member 70 that is dimensioned to straddle a tubular portion 34 of a sidewall panel 16. Such a loading platform 64 may be quickly shifted from location to location on the sides of the multiple compartment structure and when not in use may be stowed on the truck.

It will be appreciated that the described components of the multiple compartment structure may be readily fabricated at a factory out of stock rods, bars and tubes at economical cost and it will be appreciated that all of the components for a complete multiple compartment structure may be shipped in compact form to a truck owner. A crew of unskilled workers may easily complete the assembly of the multiple compartment structure in half a day and at the end of the season an unskilled crew may easily dismantle the multiple compartment structure in half a day to free the truck for general use.

My description in specific detail of the presently preferred embodiment of the invention will suggest various changes, substitutions and other departures from my disclosure.

I claim:

1. In a structure on a base such as a truck bed forming a plurality of layers of compartments having open sides, the combination of:
   a plurality of upright wall members defining the compartments, said wall members having portions with vertical passages therethrough;
   a plurality of horizontal panels having apertures therein and forming the floors and ceilings of the compartments;
   a plurality of rods extending upward from the base to hold said wall members and horizontal panels in assembled positions, said rods extending through the vertical passages of the wall members and through the apertures of the horizontal panels;
   door brackets at the open sides of the compartments, said door brackets having holes therein with rods of said plurality of rods extending through the holes to anchor the door brackets; and
   doors for the compartments mounted on said door brackets.

2. A combination as set forth in claim 1 in which said doors have laterally extending pivots and said door brackets captivate the pivots.

3. A combination as set forth in claim 2 in which the doors have laterally extending latch pins;
   in which the door brackets provide hooks for releasable engagement by said latch pins; and
   in which the loops of the door brackets that pivotally retain said pivots are vertically elongated to permit the doors to be lifted to release the latch pins from the hooks.

4. A knockdown assembly to form a structure on a truck bed to provide layers of compartments opening onto at least one side of the truck bed, comprising:
   a plurality of sidewall panels to form the sidewalls of the compartments, each sidewall panel having opposite end portions with vertical passages therethrough;
   a plurality of backwall panels to form the backwalls of the compartments, each of the backwall panels having opposite end portions with vertical passages therethrough;
   a plurality of rods for fixedly mounting in upright positions on the truck bed to telescope into the vertical passages of said panels;
   a plurality of floor panels to form floors and ceilings of the compartments and having holes to telescope over said rods; and
   a plurality of door brackets apertures to telescope over said rods to mount said doors on the structure.

5. An assembly as set forth in claim 4 in which each of said doors is of generally rectangular configuration and has projections extending longitudinally therefrom near its four corners to engage said brackets,
   said brackets forming loops to engage two of the projections of each door; and
   said brackets forming hooks to releasably engage the other two projections of each door to releasably hold the door in closed position.

6. The combination with a vehicle bed of a structure thereon having compartments at different levels arranged in vertical tiers in two rows along the two sides respectively of the bed;
   the compartments having spaced upright sidewall panels substantially perpendicular to the longitudinal axis of the bed and having upright backwall panels substantially parallel with the longitudinal axis of the bed;
   each of said sidewall panels of the compartments having a pair of vertical passages therethrough comprising passages at the opposite ends respectively of the panel, said pairs of passages being aligned to form pairs of series of aligned passages extending vertically through each tier;
   a first plurality of upright rods extending upward from said bed through the pairs of series of aligned passages to secure the sidewall panels of the compartments;
   each of the backwall panels having a pair of vertical passages therethrough comprising passages at the opposite ends respectively of the panel, said pairs of passages through the backwall panels being aligned to form pairs of series of aligned passages extending vertically through each tier;
   a second plurality of upright rods extending upward from said bed through the pairs of series of aligned passages of the backwall panels to secure the backwall panels of the compartments;
   horizontal panels forming floors and ceilings of the compartments, said horizontal panels being supported by upright wall panels of the compartments;
   closures for the outer sides of the compartments affording access to the compartments;
   said sidewall panels of the compartments cooperating with the first plurality of upright rods to lend rigidity to the structure in vertical planes extending transversely of the bed; and
   said backwall panels of the compartments cooperating with said second plurality of upright rods to lend rigidity to the structure in upright planes extending longitudinally of the bed.

7. A combination as set forth in claim 6 in which said upright rods are in readily releasable engagement with the bed of the vehicle whereby the upright rods may be released from the bed for completely dismantling of the structure to completely clear the vehicle bed for use for other cargo.

8. A combination as set forth in claim 6 in which said horizontal panels have apertures receiving rods of both of the pluralities of upright rods;
   in which some of the horizontal panels extend through a plurality of tiers to tie the tiers together;
   in which some of the horizontal panels are positioned end to end on the same level with the juncture between two of the horizontal panels intermediate the two upright sidewall panels of a compartment;
   which includes flat rigid reinforcement members on the undersides of the two panels extending across the juncture to keep the two confronting ends of the horizontal panels in alignment; and each of said reinforcement members having holes at its opposite ends receiving corresponding rods of said upright rods.

9. A combination as set forth in claim 6 in which said horizontal panels have apertures to receive both of the pluralities of the upright rods to cooperate therewith to lend rigidity to the structure in horizontal planes, some of said horizontal panels extending through a plurality of tiers to tie the tiers together.

10. A combination as set forth in claim 9 in which said upright rods are in readily releasable engagement with the bed of the vehicle whereby the upright rods may be released from the bed for completely dismantling of the structure to completely clear the vehicle bed for use for other cargo.

11. A combination as set forth in claim 6 in which the upright backwall panels of the compartments are of open construction for ventilation and in which the upright backwall panels of the compartments on one side of the bed are spaced from the upright backwall panels of the compartments on the other side of the bed to form a central ventilation space extending longitudinally of the bed, there being three of the upright rods positioned close together where the upright backwall panels of one tier are adjacent the upright backwall panels of another tier, two of the three rods anchoring ends of backwall panels of the two tiers, the third of the three rods anchoring ends of upright sidewall panels that are common to the two tiers.

12. A combination as set forth in claim 11 in which said upright rods are in readily releasable engagement with the bed of the vehicle whereby the upright rods may be released from the bed for completely dismantling of the structure to completely clear the vehicle bed for use for other cargo.

13. A combination as set forth in claim 11 in which said horizontal panels have apertures to receive both of the pluralities of the upright rods to cooperate therewith to lend rigidity to the structure in horizontal planes, some of said horizontal panels extending through a plurality of tiers to tie the tiers together.